US007010360B2

(12) United States Patent
Atkin et al.

(10) Patent No.: US 7,010,360 B2
(45) Date of Patent: Mar. 7, 2006

(54) AUTOMATIC CONVERSION OF DATES AND TIMES FOR MESSAGING

(75) Inventors: Steven Edward Atkin, Austin, TX (US); Cornell G. Wright, Jr., Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 139 days.

(21) Appl. No.: 10/718,097

(22) Filed: Nov. 20, 2003

(65) Prior Publication Data

US 2005/0114768 A1 May 26, 2005

(51) Int. Cl.
G05B 11/01 (2006.01)
(52) U.S. Cl. ............................. 700/16; 700/13; 700/14; 700/15; 700/65; 700/66; 455/502; 455/503; 455/525; 340/309.4; 307/41; 379/88.09; 379/128; 379/142.11; 379/207.03
(58) Field of Classification Search .................. 700/13, 700/14, 15–16, 65, 66; 455/502, 503, 525; 340/309.4; 307/41; 379/88.09, 128, 142.11, 379/207.03
See application file for complete search history.

(56) References Cited

U.S. PATENT DOCUMENTS

| | | | | |
|---|---|---|---|---|
| 6,016,478 A | * | 1/2000 | Zhang et al. .................... 705/9 |
| 6,323,767 B1 | | 11/2001 | Gropper ....................... 340/534 |
| 6,369,720 B1 | | 4/2002 | Wilhelm ...................... 340/905 |
| 6,407,673 B1 | | 6/2002 | Lane ........................... 340/901 |
| 2001/0032175 A1 | * | 10/2001 | Holden et al. ................. 705/37 |
| 2002/0022498 A1 | | 2/2002 | Hokao ......................... 455/556 |
| 2002/0035467 A1 | | 3/2002 | Morimoto et al. .............. 704/9 |
| 2002/0107811 A1 | * | 8/2002 | Jain et al. ...................... 705/64 |
| 2002/0116172 A1 | | 8/2002 | Vargas ........................... 704/8 |
| 2002/0142783 A1 | | 10/2002 | Yoldi et al. .................. 455/456 |
| 2002/0161666 A1 | | 10/2002 | Fraki et al. ................... 705/26 |
| 2002/0177428 A1 | | 11/2002 | Menard et al. .............. 455/404 |
| 2003/0022679 A1 | * | 1/2003 | Chen et al. .................. 455/502 |

FOREIGN PATENT DOCUMENTS

| | | |
|---|---|---|
| JP | 2000261573 | 9/2000 |
| JP | 2002041844 | 2/2002 |
| WO | WO 01/26393 | 4/2001 |

* cited by examiner

Primary Examiner—Ramesh Patel
(74) Attorney, Agent, or Firm—Duke W. Yee; Herman Rodriguez; Mari Stewart

(57) ABSTRACT

A system and method are disclosed for automatically converting dates and times in electronic text messages to the local dates and times of the message recipients. For example, when a text message is sent to an intended recipient, a messaging server can recognize date and time strings in the message text string, if any. The server can parse the date/time information into Coordinated Universal Time ("UTC") form. The server also receives locale and time zone information from the intended recipient's client application, and can send this information to the originating client application. The originating client application can use this locale and time zone information to convert the UTC date/time information from the message string, if any, to the localized date and time of the message recipient. The localized date/time information is inserted into the message string, and the resulting message is forwarded to the recipient. As an option, the original message string may also be conveyed to the recipient for verification purposes.

20 Claims, 3 Drawing Sheets

AUTOMATIC CONVERSION OF DATES AND TIMES FOR MESSAGING

BACKGROUND OF THE INVENTION

1. Technical Field

The present invention is directed to a system and method for automatic conversion of dates and times for messaging applications. More specifically, the present invention is directed to the conversion of dates and times in text messages to the local dates and times of the message recipients.

2. Description of Related Art

Undoubtedly, the Internet has substantially changed the way people communicate. For example, e-mail has replaced letters and telephone calls as the preferred method of correspondence for many people around the world. In fact, billions of e-mail messages are sent out each day.

Communicating by e-mail is simply not fast enough for many of us. For example, someone sending an e-mail message does not know if an intended recipient is on-line at any particular time. Also, the processes of sending, reading and replying to e-mail messages entail certain steps that take up time. Consequently, instant messaging is becoming increasingly popular.

Instant messaging is a new form of electronic text messaging service that allows users to correspond with each other in real-time. Typically, a user maintains a list of contacts or a "buddy list". The user can send instant messages to anyone on the list, as long as that person is on-line. A user types a message into a dialog box. The instant messaging system sends the message instantly to be read by the recipient. Sending the message opens a window where the originator and recipient can then type in messages that both can see. Thus, a significant advantage of instant messaging is that it allows people in different locales to use the Internet to "talk" to one another without telephones.

On the other hand, a significant drawback of existing instant messaging systems (as well as conventional e-mail messaging systems) is that if dates and times are included in the messages, users in different time zones and locales can interpret these dates and times differently. For example, assume that one instant messaging user is located in the U.S. Central Standard Time Zone, and a second user is located in the U.S. Eastern Standard Time Zone. If the user in the Central Time Zone types the message "I'll check back with you today at 4:00 PM," the user in the Eastern Time Zone can interpret the message to read "I'll check back with you today at 4:00 PM" Eastern Standard Time. Obviously, this interpretation is wrong. Typically, if one of the users realizes that the given time may be misinterpreted, then a series of additional messages usually follow to clear up the misunderstanding. Otherwise, the users may fail to communicate with each other at the appointed time.

Therefore, there is a need for a system and method for automatically converting dates and times in electronic text messages to the local dates and times of the message recipients.

SUMMARY OF THE INVENTION

The present invention provides a system and method for automatically converting dates and times in electronic text messages to the local dates and times of the message recipients. For a preferred embodiment, when a text message is sent to an intended recipient, a messaging server can recognize date and time strings in the message text string, if any. The server can parse the date/time information into Coordinated Universal Time ("UTC") form. The server also receives locale and time zone information from the intended recipient's client application, and can send this information to the originating client application. The originating client application can use this locale and time zone information to convert the UTC date/time from the message string, if any, to the localized date and time of the message recipient. The localized date/time information is inserted into the message string, and the resulting message is forwarded to the recipient. As an option, the original message string may also be conveyed to the recipient for verification purposes.

These and other features and advantages of the present invention will be described in, or will become apparent to those of ordinary skill in the art in view of, the following detailed description of the preferred embodiments.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
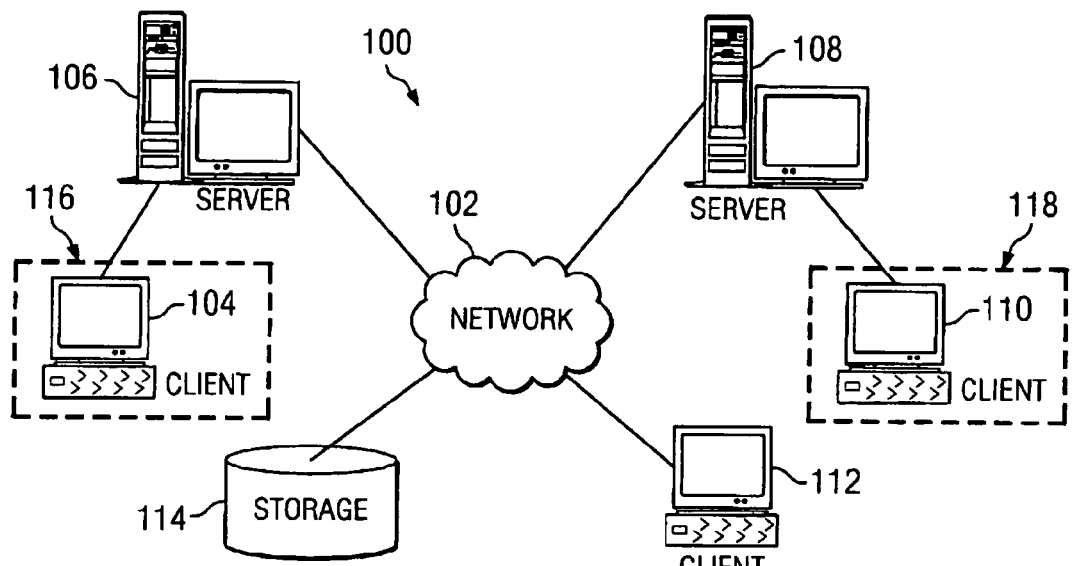
FIG. 1 is a pictorial representation of a network of data processing systems in which the present invention may be implemented.

With reference now to the figures, FIG. 1 depicts a pictorial representation of a network of data processing systems in which the present invention may be implemented. As such, network data processing system 100 is a network of computers in which the present invention may be implemented. Network data processing system 100 includes a network 102, which is the medium used to provide communications links between various devices and computers connected together within network data processing system 100. Network 102 may include connections, such as wire, wireless communication links, or fiber optic cables.

In the depicted example, client 104 is connected to server 106, which in turn, is connected to network 102. In addition, client 110 is connected to server 108, which in turn, is connected to network 102. Also, for this example, client 112 is connected to network 102 along with storage unit 114.

Clients 104, 110 and 112 may be, for example, personal computers or network computers. In the depicted example, server 106 provides data, such as boot files, operating system images, and applications to client 104. Server 108 provides data, such as boot files, operating system images, and applications to client 110. As such, clients 104, 110 are clients to respective servers 106, 108.

Client 112 is connected to network 102. However, this arrangement is shown for illustrative purposes only, and the type and arrangement of the connection between client 112 and network 102 is not intended as an architectural limitation for the present invention. For example, client 112 may be connected to network 102 (and also to one of the servers 106, 108) via a wireless communication link, such as, for example, a radiotelephone communication link, cellular communication link, satellite communication link, etc. As such, client 112 may represent a wireless data processing device, such as, for example, a Personal Digital Assistant (PDA), wireless text-messaging device, Wireless Fidelity ("Wi-Fi") device, or cellular radiotelephone. In any event, network data processing system 100 may include additional servers, clients, and other devices not shown.

In accordance with a preferred embodiment of the present invention, it may be assumed for illustrative purposes that client 104 is located within a first time zone (e.g., U.S. Central Standard Time Zone) 116 as denoted by the dashed lines shown. Also, it may be assumed that client 110 is located within a second time zone (e.g., U.S. Eastern Standard Time Zone) 118 as denoted by the dashed lines shown. Also, it may be assumed that client 112 may be located within one of first time zone 116, second time zone 118, or a third time zone (not shown). As such, the specific locations and time zones for clients 104, 110 and 112 described herein are provided for illustrative purposes only and not intended as an architectural limitation for the present invention.

In the depicted example, network data processing system 100 is the Internet, with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, Local Area Network (LAN), or Wide Area Network (WAN). As such, FIG. 1 is intended as an example, and not as an architectural limitation for the present invention.

Figure 2:
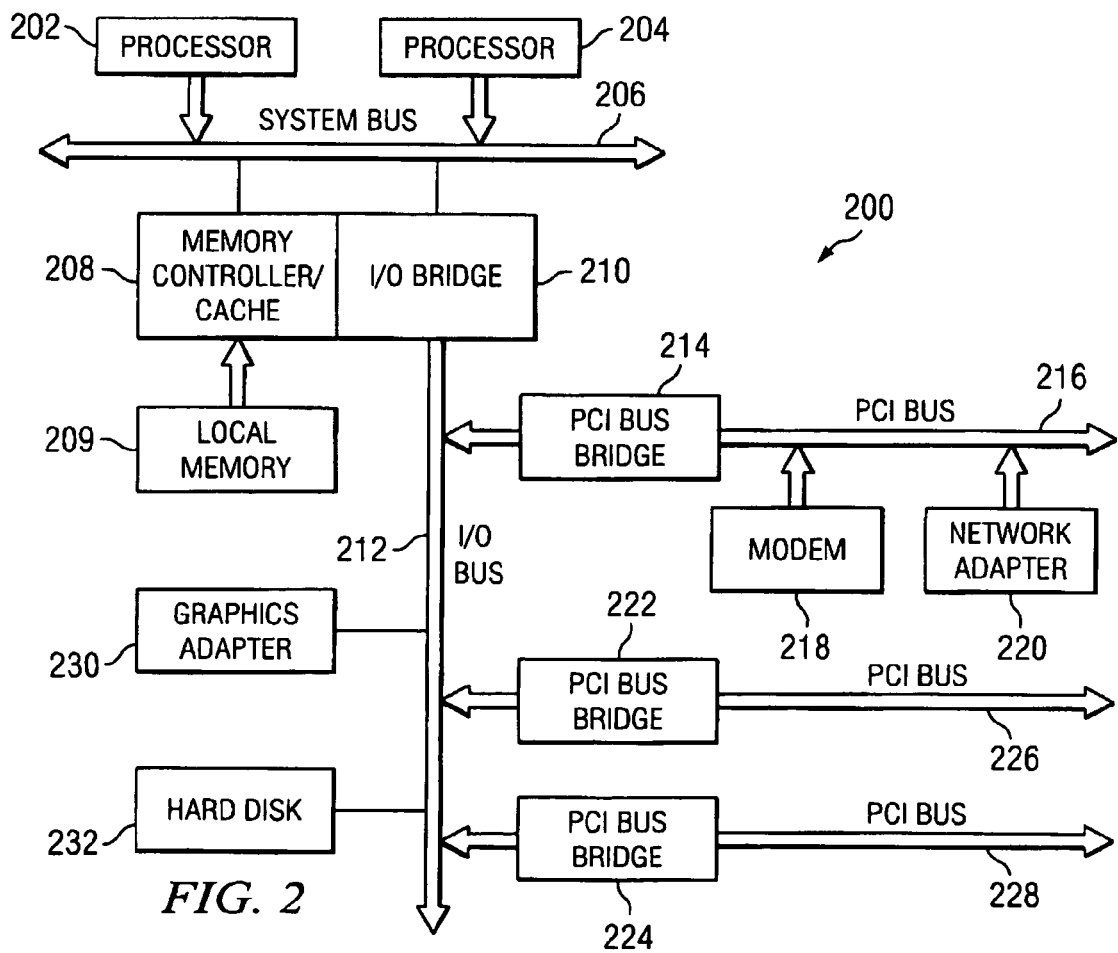
FIG. 2 is a block diagram of a data processing system that may be implemented as a server in accordance with a preferred embodiment of the present invention.

Referring to FIG. 2, a block diagram of a data processing system that may be implemented as a server, such as server 106 or server 108 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 104, 110 in FIG. 1 may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

Figure 3:
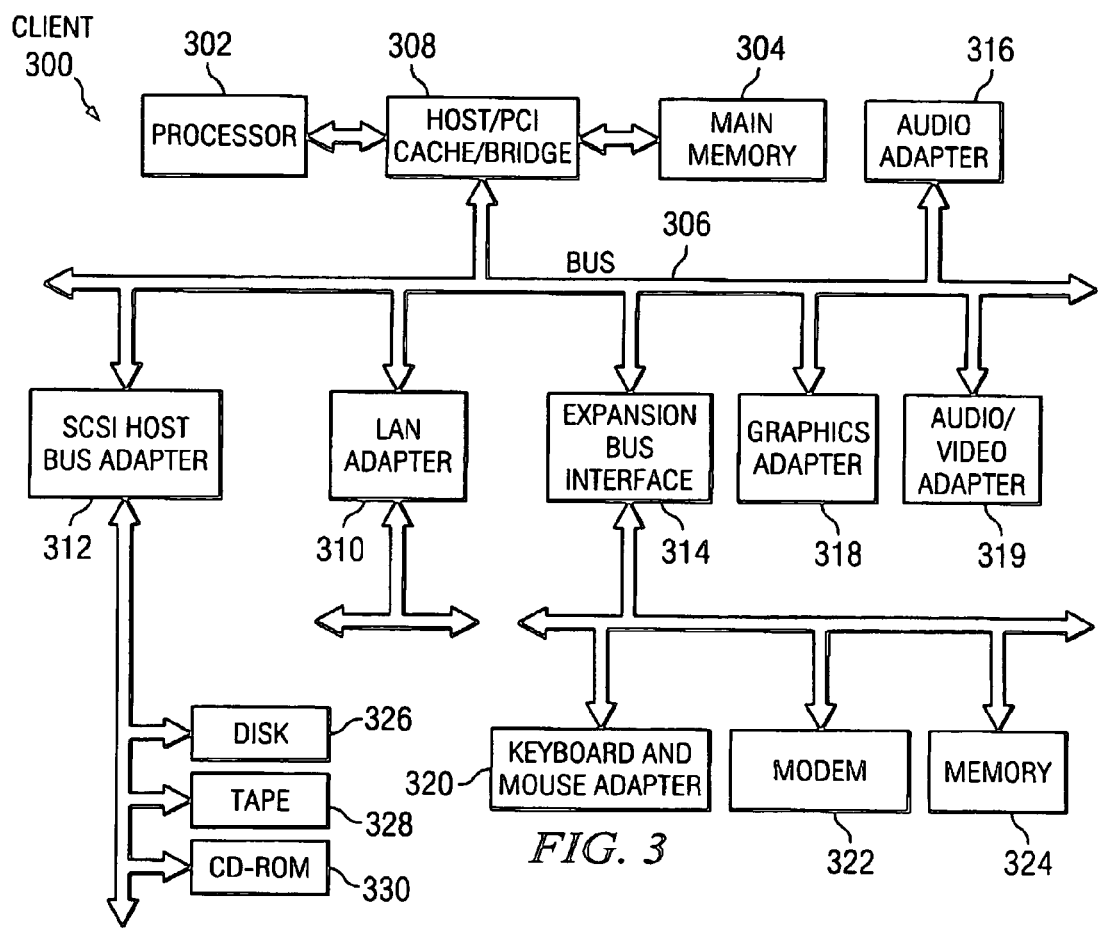
FIG. 3 is a block diagram illustrating a data processing system in which the present invention may be implemented.

With reference now to FIG. 3, a block diagram illustrating a data processing system is depicted in which the present invention may be implemented. Data processing system 300 is an example of a client computer, such as client 104, 110 or 112 in FIG. 1. Data processing system 300 employs a PCI local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, LAN adapter 310, Small Computer System Interface (SCSI) host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented programming system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

The depicted example in FIG. 3 and above-described examples are not meant to imply architectural limitations.

For example, data processing system 300 also may be a notebook computer or hand held computer in addition to taking the form of a PDA. Data processing system 300 also may be a kiosk or a Web appliance.

Figure 4:
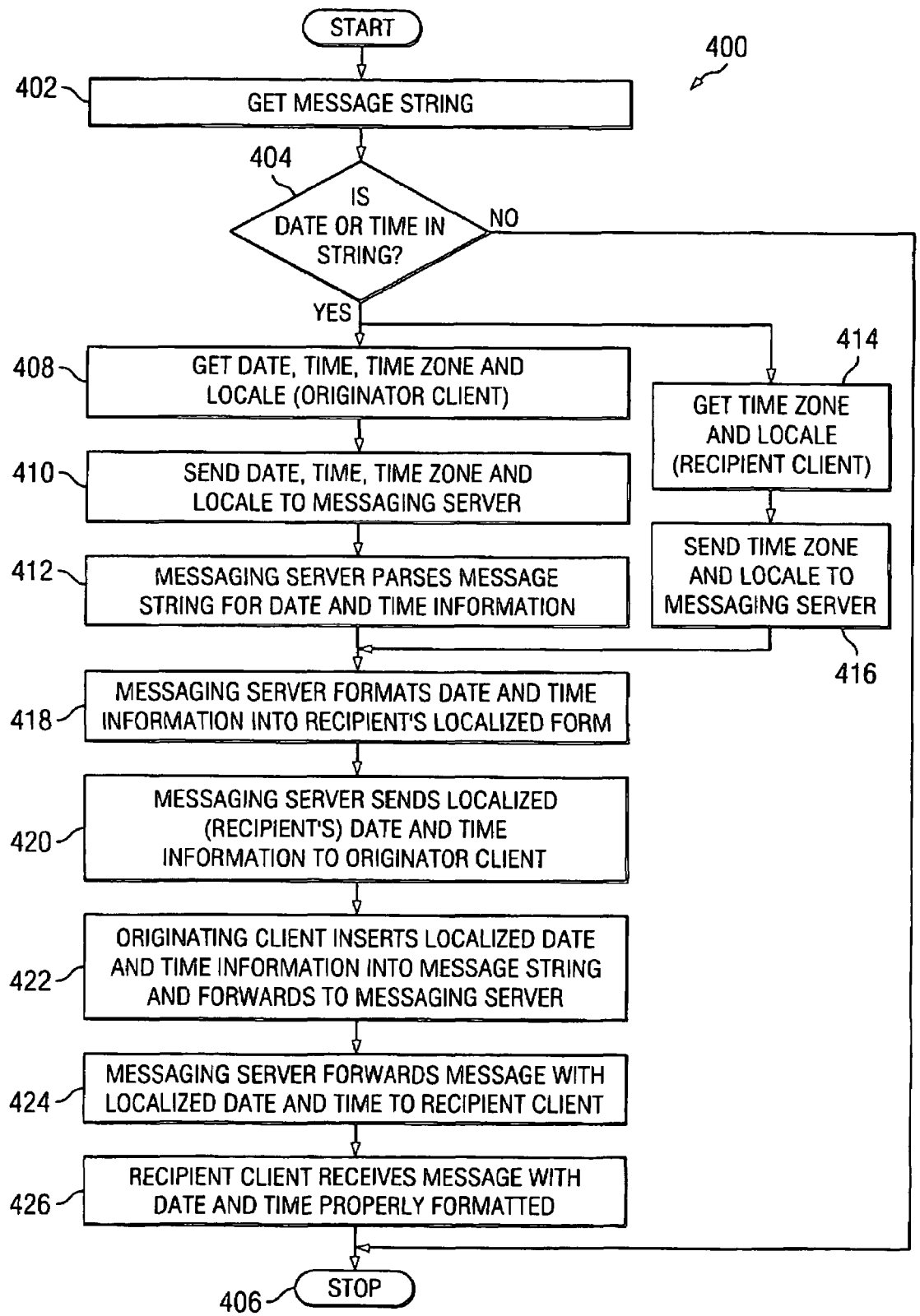
FIG. 4 is a flowchart outlining an exemplary operation of the present invention.

Referring now to FIG. 4, a flowchart of a process for automatically converting dates and times in text messages to the local dates and times of the message recipients in a network of data processing systems is depicted in accordance with a preferred embodiment of the present invention. The exemplary process illustrated in FIG. 4 may be implemented by software executing in a data processing system, such as data processing system 200 in FIG. 2 and/or data processing system 300 in FIG. 3. For example, exemplary process 400 illustrated in FIG. 4 may be implemented in a client (e.g., client application associated with one or more of clients 104, 110, 112) and/or a server (e.g., 106, 108) with a series of "Call" functions (or similar functions, instructions, commands, etc.) executed with a Java Application Program Interface (API). Alternatively, for example, process 400 may be implemented with a series of instructions (commands, etc.) executed with a Windows API, or other appropriate software application. Also, for this example, one or both of servers 106, 108 may be a messaging server (e.g., instant messaging server or e-mail messaging server).

Process 400 begins by (originator) client 104 retrieving a message string from a text message intended for (recipient) client 110 (step 402). For this example, as mentioned above, it may be assumed that client 104 is located in a first time zone 116 (e.g., U.S. Central Time Zone) and client 110 is located in a second time zone 118 (e.g., U.S. Eastern Time Zone). Notably, proper interpretation of time information is a primary consideration for this particular example (e.g., for a two hour difference between time zones). However, proper interpretation of date information can become a more important consideration for greater distances between time zones.

For example, there is a seventeen-hour difference in time zones between New York City and Tokyo. Therefore, a text message originating in New York City of "Let's get back together at 4:00 PM on Nov. 1, 2003" may cause a message recipient in Tokyo to mistakenly logon for messaging just prior to 4:00 PM on Nov. 1, 2003 Tokyo time, which is actually 11:00 PM on Oct. 31, 2003 U.S. Eastern Time. Nevertheless, process 400 can compensate for local differences in both dates and times.

For this example, client 104 can retrieve date and time information, if any, from the message string with a Java Call function of DateFormat.parse( ). In response, a Java API (e.g., executed in client 104) parses the text from the message string to return a date (and/or time), if any, from the string (step 404). The returned date can be represented as a Date object or as the time in milliseconds since Jan. 1, 1970, 00:00:00 Greenwich Mean Time (GMT). In any event, a returned Date object represents a specific instant of time, with millisecond precision. If no date or time information is parsed from the message string (e.g., the message did not include date or time information), process 400 can be terminated (step 406).

If date and/or time information is returned from the message string (returning to step 404), client 104 can retrieve its current date, time, time zone and locale information (e.g., at that moment) with a set of Java Call functions (step 408). For example, client 104 can retrieve its current date and time with a Java Call function of Calendar.getInstance( ). Note at this point that retrieval of the current time and date may be an optional step for client 104, but is not intended as a requirement or architectural limitation for the present invention. In response, the Java API in client 104 can return a Calendar object whose time fields have been initialized with the current date and time. Also, client 104 can retrieve its current locale information with a Call function of DateFormat.getDateInstance( ). In response, the Java API in client 104 can return a date formatter with the default formatting style (e.g., "LONG") for the default locale (e.g., U.S.).

Additionally, client 104 can retrieve its current time zone information with a Call function of DateFormat.getTimeZone( ). In response, the Java API in client 104 can return the time zone associated with the calendar of the DateFormat Class (e.g., time zone of client 104). For this example, client 104 then sends the original message string and the current date, time, time zone and locale information to an associated messaging server, such as, for example, server 106 (step 410).

The messaging server (e.g., server 106) parses the date and/or time information from the original message string (step 412). For example, server 106 can parse the date and/or time information from the message string with a Call function of DateFormat.parse( ). In response, a Java API (e.g., executing in server 106) parses the text from the message string to return the date and/or time information from the string. Alternatively, depending upon the implementation preferred, originating client 104 may parse the date and/or time information from the original message string. As mentioned above, the returned date can be represented as a Date object or as the time in milliseconds since Jan. 1, 1970, 00:00:00 Greenwich Mean Time (GMT). For this example, the returned time information is preferably represented in UTC (GMT) form.

Returning again to step 404, if date and/or time information is returned from the message string, (recipient) client 110 can retrieve its current time zone and locale information with a set of Java Call functions (step 414). For example, client 110 can retrieve its current locale information with a Call function of DateFormat.getDateInstance( ). In response, a Java API (e.g., in client 110) returns a date formatter with the default formatting style (e.g., "LONG") for the default locale (e.g., U.S.). Additionally, client 110 can retrieve its current time zone information with a Call function of DateFormat.getTimeZone( ). In response, the Java API in client 110 returns the time zone associated with the calendar of the DateFormat Class (e.g., time zone for client 110). For this example, (recipient) client 110 then sends its current time zone and locale information to the messaging server (e.g., server 106) via server 108 and network 102 (step 416).

Summarizing at this point in process 400, messaging server 106 has received originating client's 104 current date, time, time zone and locale information, along with recipient client's 110 current time zone and locale information. Also, messaging server 106 has parsed the message string and retrieved the date and time information from the string. Messaging server 106 can then format the date and time information from the message string into recipient client's 110 localized form (step 418).

For example, messaging server 106 can format the date and time information from the message string into the recipient client's 110 local form, by creating a date/time formatter associated with recipient client's 110 locale with a Call function of DateFormat.getDateTimeInstance(Locale currentLocale) and using the current locale information for recipient client 110. In response, the Java API in messaging server 106 gets the date/time formatter with the default formatting date and time styles for the given locale. Messaging server 106 then sends the date/time formatter with the default formatting date and time styles for recipient client's 110 locale to originating client 104 (step 420).

For this exemplary embodiment, client 104 can use the date/time formatter received from messaging server 106 to insert the date/time information (in recipient client's 110 localized format) into the original message string, and send the newly formatted string to messaging server 106 (step 422). For example, client 104 can insert the date/time information (in recipient client's 110 localized format) into the message string with a Call function of DateFormat.format( ). In response, the Java API in client 104 formats the results of the DateFormat.getDateTimeInstance(Locale currentLocale) call associated with recipient client's 110 locale, and creates a message string that includes the recipient client's 110 local date/time information. Client 104 then sends the newly created message string (also the original message string, if desired) to messaging server 106.

Messaging server 106 sends the newly created message string (including the recipient client's 110 localized date/time information) to recipient client 110 (step 424). Recipient client 110 receives client's 104 message with the included date/time information properly formatted for recipient client's 110 local time zone (step 426). Notably, it should be clear to one of ordinary skill in the relevant art that process 400 also may be used to convert date/time information in a message originated by client 110 (or 112, for example) and intended for client 104, into the proper date/time format for client's 104 local time zone.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for automatically converting date and time information in a text message to a local date and time of a message recipient in a network of data processing systems, the method comprising the steps of:
   sending a text message from a first location in a first time zone, said text message intended for a recipient located in a second time zone, said text message including a string of at least one of date information and time information;
   identifying said second time zone; and
   converting said string of at least one of date information and time information to a second string, said second string including said at least one of data information and time information formatted with at least one of a date format and a time format associated with said second time zone.

2. The method of claim 1, wherein said first time zone is equal to said second time zone.

3. The method of claim 1, further comprising the steps of:
   inserting said second string in said text message; and
   sending said text message to said recipient located in said second time zone.

4. The method of claim 1, wherein the identifying step is performed with at least one Java call function.

5. The method of claim 1, wherein the converting step is performed with at least one Java call function.

6. The method of claim 1, wherein the identifying step and converting step are performed with an Application Program Interface.

7. The method of claim 1, wherein said text message comprises an instant message.

8. The method of claim 1, wherein said text message comprises an e-mail message.

9. The method of claim 1, wherein the identifying step further comprises the steps of:
   getting information associated with said second time zone, said information defining said second time zone and a locale associated with said second time zone.

10. The method of claim 1, wherein the converting step further comprises the steps of:
    getting first information associated with said first time zone;
    receiving second information associated with said second time zone, said second information defining said second time zone and a locale associated with said second time zone;
    extracting said at least one of date information and time information from said siring;
    formatting said at least one of date information and time information with said at least one of said date format and said time format associated with said second time zone; and
    inserting said formatted said at least one of date information and time information into said second string.

11. A system for automatically converting date and time information in a text message to a local date and time of a message recipient in a network of data processing systems, comprising:
    a first processing unit associated with a message originator;
    a second processing unit associated with a message recipient; and
    a third processing unit, said third processing unit coupled to said first processing unit and said second processing unit;
    said first processing unit operable to send a text message from a first location in a first time zone, said text message intended for said second processing unit located in a second time zone, said text message including a string of at least one of date information and time information; and
    said third processing unit operable to identify said second time zone, and convert said string of at least one of date information and time information to a second string, said second string including said at least one of date information and time information formatted with at least one of a date format and a time format associated with said second time zone.

12. The system of claim 11, wherein said first time zone is equal to said second time zone.

13. The system of claim 11, wherein said third processing unit is further operable to:
    insert said second string in said text message; and
    send said text message to said recipient located in said second time zone.

14. The system of claim 11, wherein said third processing unit comprises a messaging server.

15. The system of claim 11, wherein said text message comprises an instant message.

16. The system of claim 11, wherein said text message comprises an e-mail message.

17. A computer program product in a computer readable medium for automatically converting date and time information in a text message to a local date and time of a message recipient in a network of data processing systems, comprising:
    first instructions for sending a text message from a first location in a first time zone, said text message intended for a recipient located in a second time zone, said text message including a string of at least one of date information and time information;
    second instructions for identifying said second time zone; and
    third instructions for converting said string of at least one of date information and time information to a second string, said second string including said at least one of date information and time information formatted with at least one of a date format and a time format associated with said second time zone.

18. The computer program product of claim 17, wherein said first time zone is equal to said second time zone.

19. The computer program product of claim 17, further comprising:
    instructions for inserting said second string in said text message; and
    instructions for sending said text message to said recipient located in said second time zone.

20. The computer program product of claim 17, wherein the second instructions and third instructions are performed with a plurality of Java call functions.

* * * * *